(12) United States Patent
Heitplatz

(10) Patent No.: US 10,618,752 B2
(45) Date of Patent: Apr. 14, 2020

(54) DEVICE FOR LOADING OR UNLOADING OF A TRANSPORT CONTAINER

(71) Applicant: BEUMER GmbH & Co. KG, Beckum (DE)

(72) Inventor: Heino Heitplatz, Drensteinfurt (DE)

(73) Assignee: BEUMER Group GmbH & Co. KG, Beckum (DE)

( * ) Notice: Subject to any disclaimer, the term of this patent is extended or adjusted under 35 U.S.C. 154(b) by 0 days.

(21) Appl. No.: 15/063,734

(22) Filed: Mar. 8, 2016

(65) Prior Publication Data

US 2016/0264366 A1  Sep. 15, 2016

(30) Foreign Application Priority Data

Mar. 10, 2015  (DE) .................. 10 2015 003 239

(51) Int. Cl.
*B65G 67/24* (2006.01)
*B65G 15/26* (2006.01)
(Continued)

(52) U.S. Cl.
CPC ............ *B65G 67/08* (2013.01); *B65G 15/26* (2013.01); *B65G 21/10* (2013.01); *B65G 21/14* (2013.01);
(Continued)

(58) Field of Classification Search
CPC .. B65G 69/003; B65G 69/005; B65G 69/006; B65G 69/04; B65G 69/0408; B65G 69/0416; B65G 69/0433; B65G 69/0441; B65G 69/045; B65G 69/0458; B65G 21/10; B65G 21/14; B65G 67/24; B65G 67/26; B65G 67/28; B65G 67/08; B65G 41/001; B65G 41/002; B65G 41/003; B65G 41/005
USPC ... 414/298, 345, 797.6, 794.6, 794.4, 797.4, 414/393, FOR. 107, 798.9, 798.2, 798.1, 414/395, 398–400, 929, 480, 490, 494, 414/528, 680, 744; 198/308.1, 339.1, 198/341.03, 506, 510.1, 512, 517, 587,
(Continued)

(56) References Cited

U.S. PATENT DOCUMENTS 3,049,251 A * 8/1962 Glew .................. B60P 1/38
414/528
3,819,068 A * 6/1974 Weir .................... B65G 67/24
193/2 R
(Continued)

FOREIGN PATENT DOCUMENTS

DE  2230113 A1  1/1974
EP  3067298 A1  3/2016
FR  2085385    12/1971

*Primary Examiner* — Jeffrey A Shapiro
(74) *Attorney, Agent, or Firm* — Renner, Otto, Boisselle & Sklar, LLP

(57) ABSTRACT

Apparatus for loading or unloading a transport container provided with a load opening, including a telescopic conveyor, which has a main conveying unit and at least one telescopic conveying unit extendable relative thereto in a longitudinal direction, having a loading or unloading apparatus, which can be moved on a driving level and is coupled with the telescopic conveyor by means of a compensating device, the compensating device permitting a relative motion between the loading or unloading apparatus and the telescopic conveyor in respect to at least one degree of freedom.

26 Claims, 7 Drawing Sheets

Figure 1:
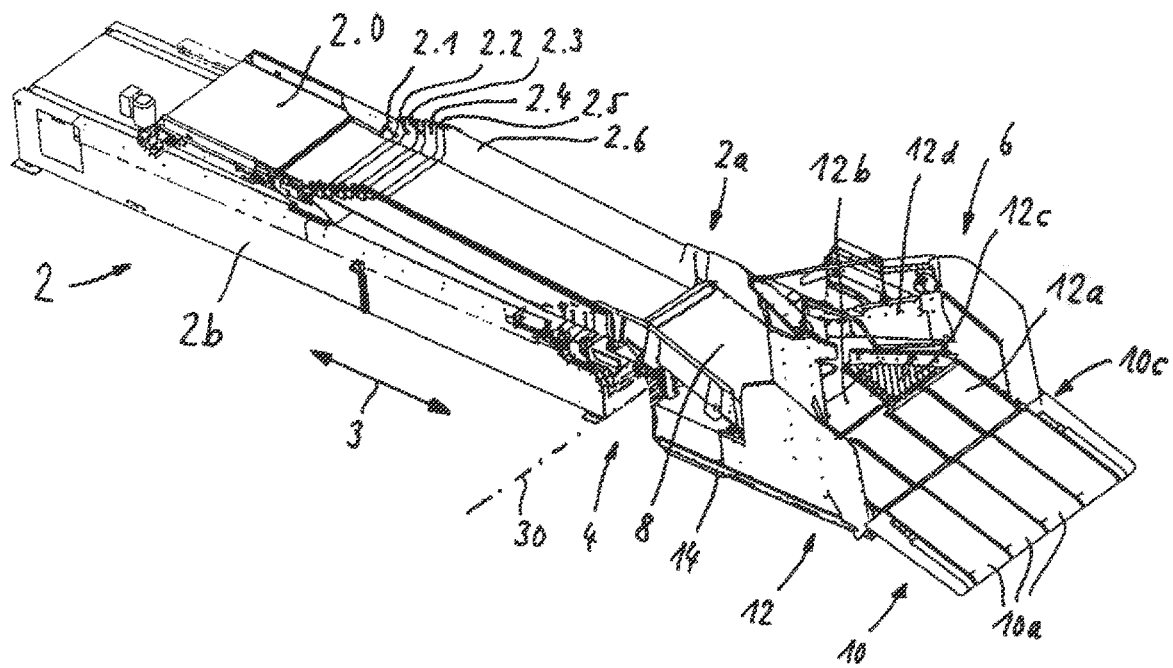

(51) Int. Cl.
*B65G 21/14* (2006.01)
*B65G 47/51* (2006.01)
*B65G 65/08* (2006.01)
*B65G 67/08* (2006.01)
*B65G 21/10* (2006.01)
*B65G 67/02* (2006.01)
*B65G 41/00* (2006.01)
*B65G 67/00* (2006.01)

(52) U.S. Cl.
CPC ......... *B65G 41/001* (2013.01); *B65G 41/005* (2013.01); *B65G 47/5131* (2013.01); *B65G 67/00* (2013.01); *B65G 67/02* (2013.01); *B65G 67/24* (2013.01); *B65G 41/002* (2013.01)

(58) Field of Classification Search
USPC ..... 198/588, 594, 618, 803.16, 804, 810.01, 198/810.04, 813, 844.1, 866, 586, 198/312–314, 317, 812, 861.2
See application file for complete search history.

(56) References Cited

U.S. PATENT DOCUMENTS

| | | | | |
|---|---|---|---|---|
| 4,436,188 A * | 3/1984 | Jones | ........................ | B06B 3/00 188/378 |
| 4,537,554 A * | 8/1985 | Collins, Jr. | ............ | B65G 67/20 414/288 |
| 5,009,560 A * | 4/1991 | Ruder | .................... | B65G 67/08 198/588 |
| 5,088,873 A * | 2/1992 | Ruder | .................... | B65G 67/08 414/392 |
| 5,351,809 A * | 10/1994 | Gilmore | ................ | B65G 21/14 198/594 |
| 5,697,753 A * | 12/1997 | Aurora | ................... | B65G 67/08 414/398 |
| 6,006,893 A * | 12/1999 | Gilmore | ................ | B65G 67/08 198/588 |
| 6,026,701 A * | 2/2000 | Reboulet | .................... | B25J 3/02 33/25.1 |
| 6,281,651 B1 * | 8/2001 | Haanpaa | ................ | B25J 9/1689 318/568.11 |
| 6,412,363 B1 * | 7/2002 | Brogårdh | ................... | B25J 9/02 414/744.5 |
| 6,431,346 B1 * | 8/2002 | Gilmore | ................ | B65G 21/14 198/588 |
| 6,481,563 B1 * | 11/2002 | Gilmore | ................ | B65G 67/08 198/511 |
| 6,484,862 B1 * | 11/2002 | Gilmore | ................ | B65G 21/14 193/35 TE |
| 7,819,270 B1 * | 10/2010 | Hughes | ................ | B65D 21/086 220/4.03 |
| 8,978,871 B1 * | 3/2015 | Guider | ................... | B65G 37/00 198/456 |
| 9,604,797 B2 * | 3/2017 | Heitplatz | ............... | B65G 67/08 |
| 2005/0226707 A1 * | 10/2005 | Quenzi | ..................... | B60P 1/02 414/482 |
| 2007/0012548 A1 * | 1/2007 | Yang | ..................... | B65G 67/08 198/812 |
| 2007/0158162 A1 * | 7/2007 | Makinen | ............. | B65G 41/002 198/312 |
| 2007/0284214 A1 * | 12/2007 | Canapa | ................. | B65G 13/12 198/312 |
| 2009/0074546 A1 * | 3/2009 | Christensen | ............. | B64F 1/32 414/298 |
| 2009/0250325 A1 * | 10/2009 | Melancon | ........... | B65G 17/086 198/851 |
| 2011/0066278 A1 * | 3/2011 | Pinault | ................ | A61N 5/1049 700/213 |
| 2012/0087770 A1 * | 4/2012 | Pippin | .................... | B65G 67/24 414/795.4 |
| 2012/0097498 A1 * | 4/2012 | Campbell | .............. | B65G 67/08 198/317 |
| 2012/0160636 A1 * | 6/2012 | Windfeld | ............. | B65G 41/005 198/592 |
| 2012/0325969 A1 * | 12/2012 | Helmner | ................ | B64D 9/00 244/137.1 |
| 2013/0008761 A1 * | 1/2013 | Takeda | ................ | B21D 43/055 198/339.1 |
| 2013/0272828 A1 * | 10/2013 | Andre | .................... | B61D 3/184 414/373 |
| 2013/0277175 A1 * | 10/2013 | Campbell | .............. | B65G 67/08 198/586 |
| 2013/0284569 A1 * | 10/2013 | Studer | ................ | B65G 17/066 198/850 |
| 2013/0313076 A1 * | 11/2013 | Stelter | ....................... | B64F 1/32 198/611 |
| 2014/0151947 A1 * | 6/2014 | Brown | .................. | B25J 9/0045 269/58 |
| 2014/0195010 A1 * | 7/2014 | Beira | ............... | A61B 17/00234 700/3 |
| 2014/0346013 A1 * | 11/2014 | Carpenter | ............. | B65G 43/02 198/617 |
| 2014/0348625 A1 * | 11/2014 | Heitplatz | ............... | B65G 67/08 414/795.4 |
| 2016/0068344 A1 * | 3/2016 | Mast | ..................... | B65G 21/10 198/463.1 |
| 2016/0122132 A1 * | 5/2016 | Bell | .................... | B65G 21/2072 198/836.3 |

\* cited by examiner

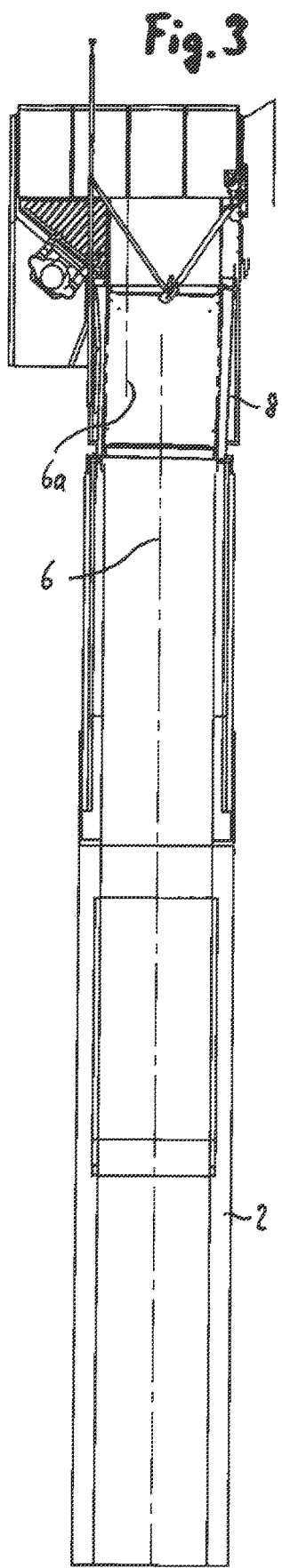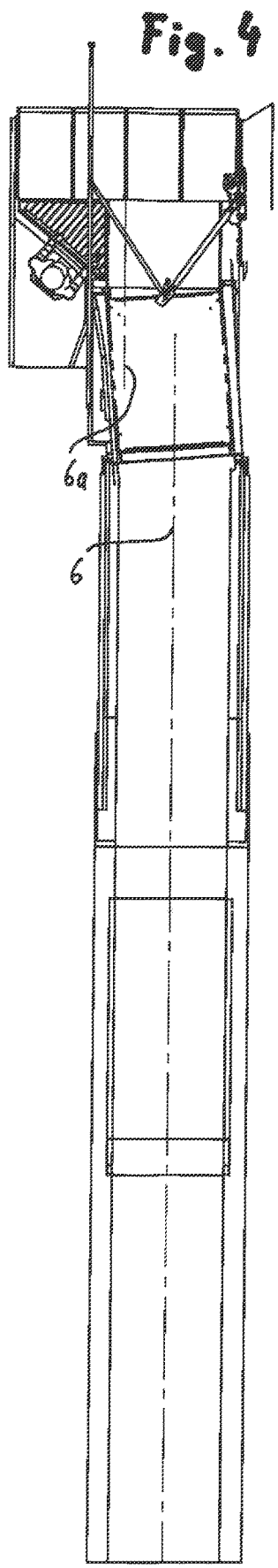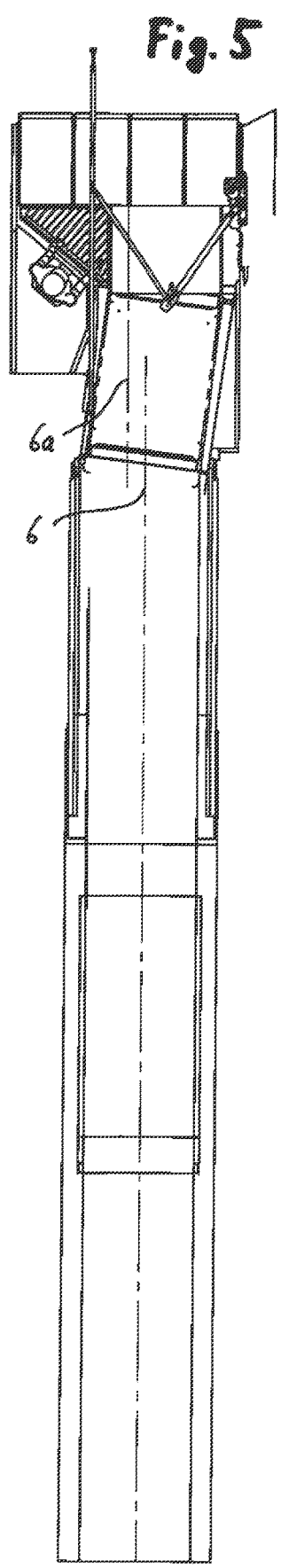

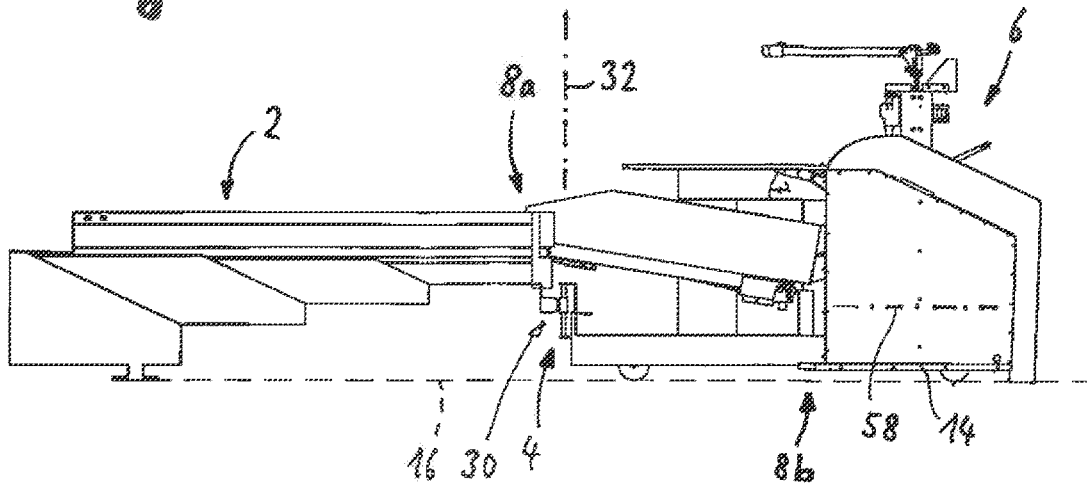
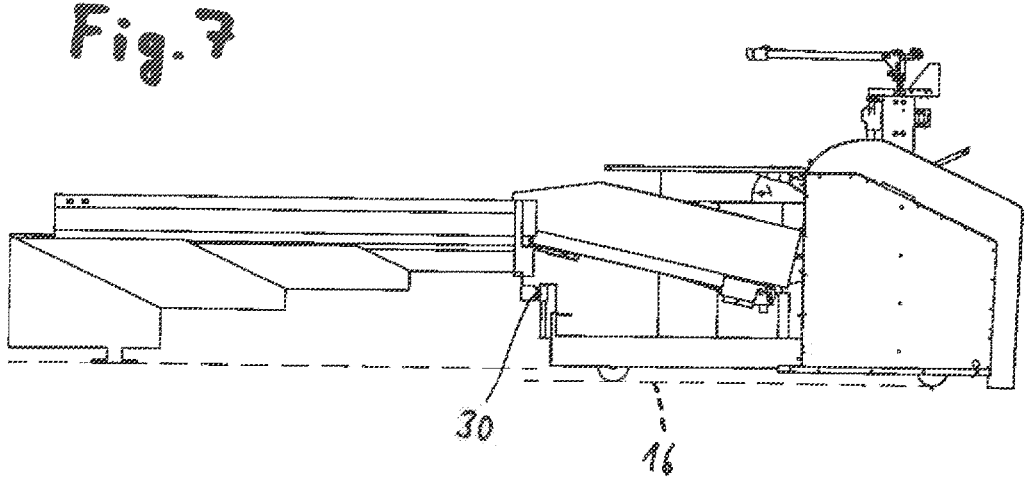
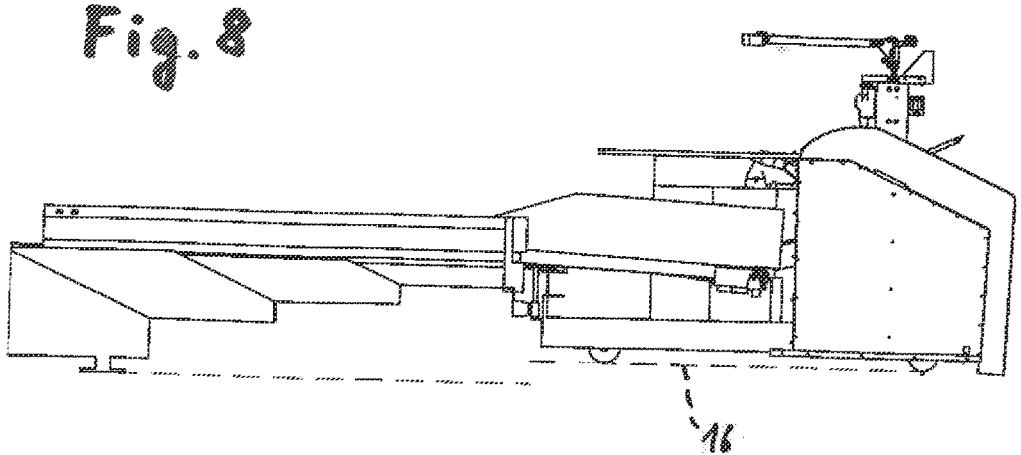

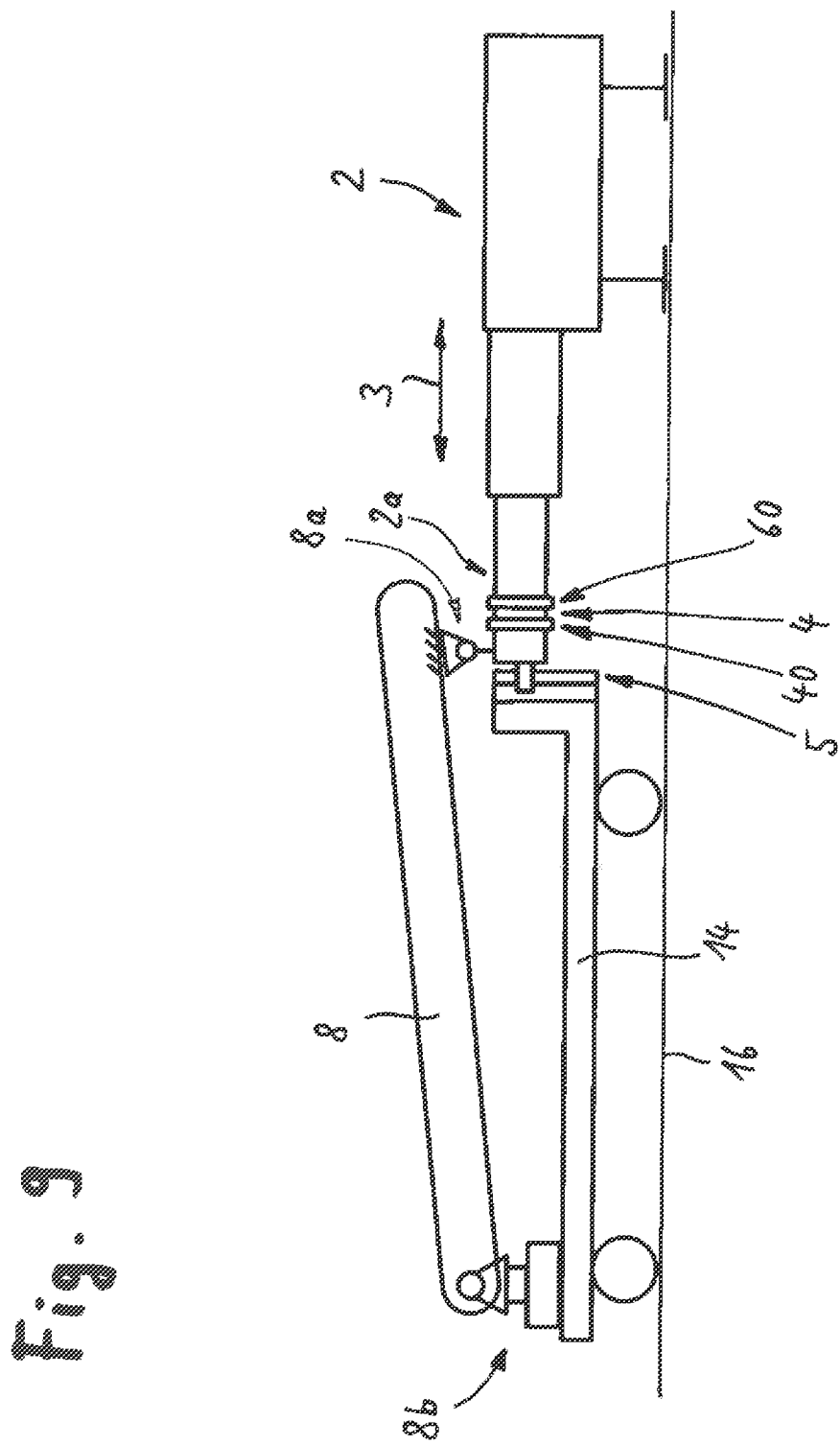

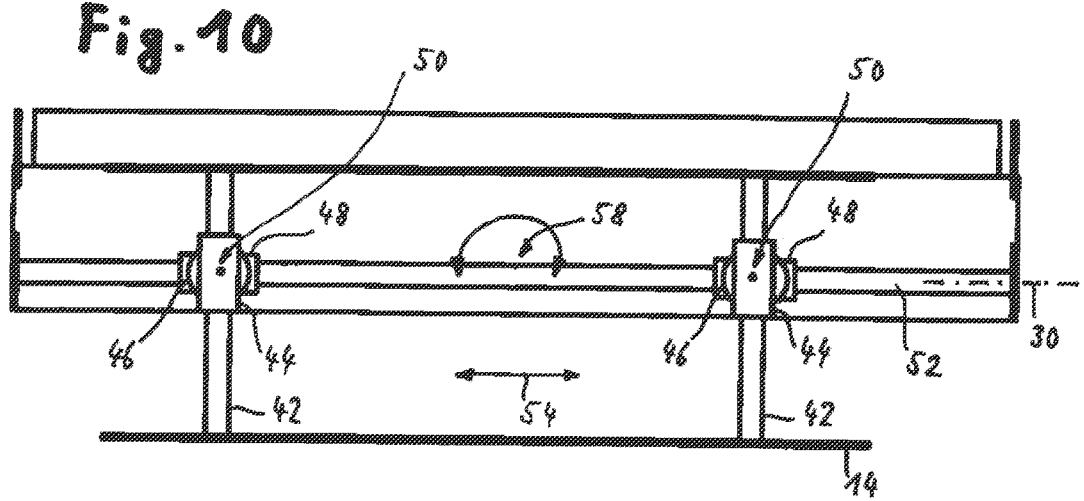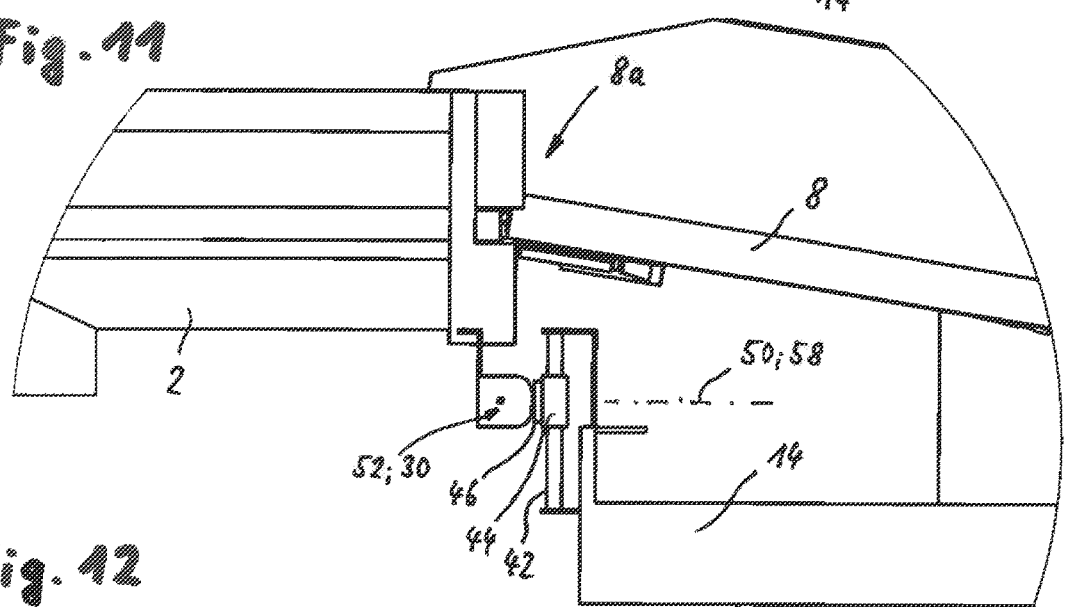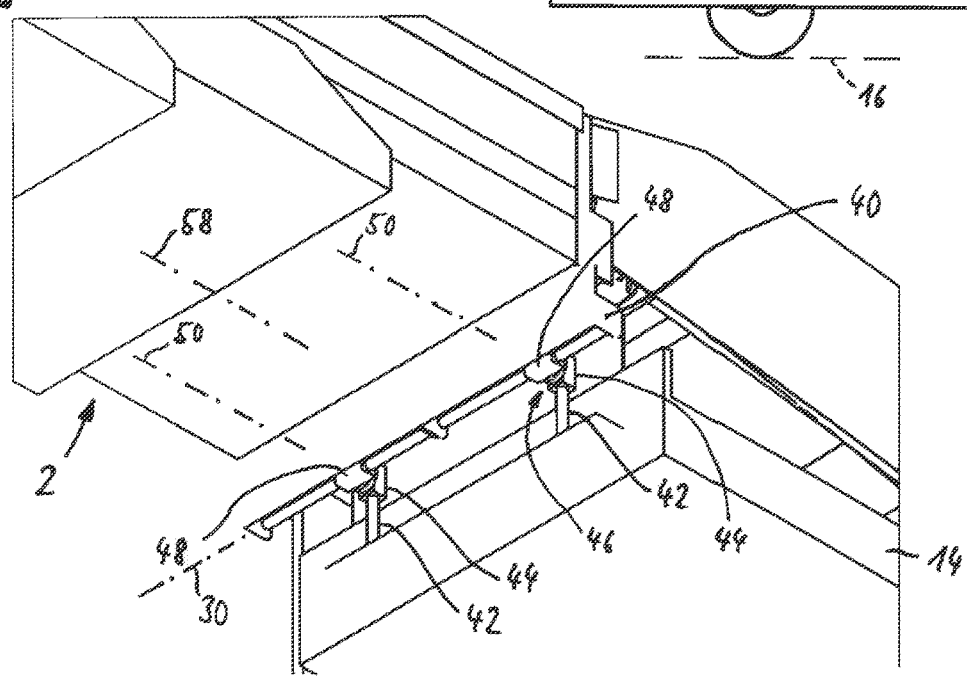

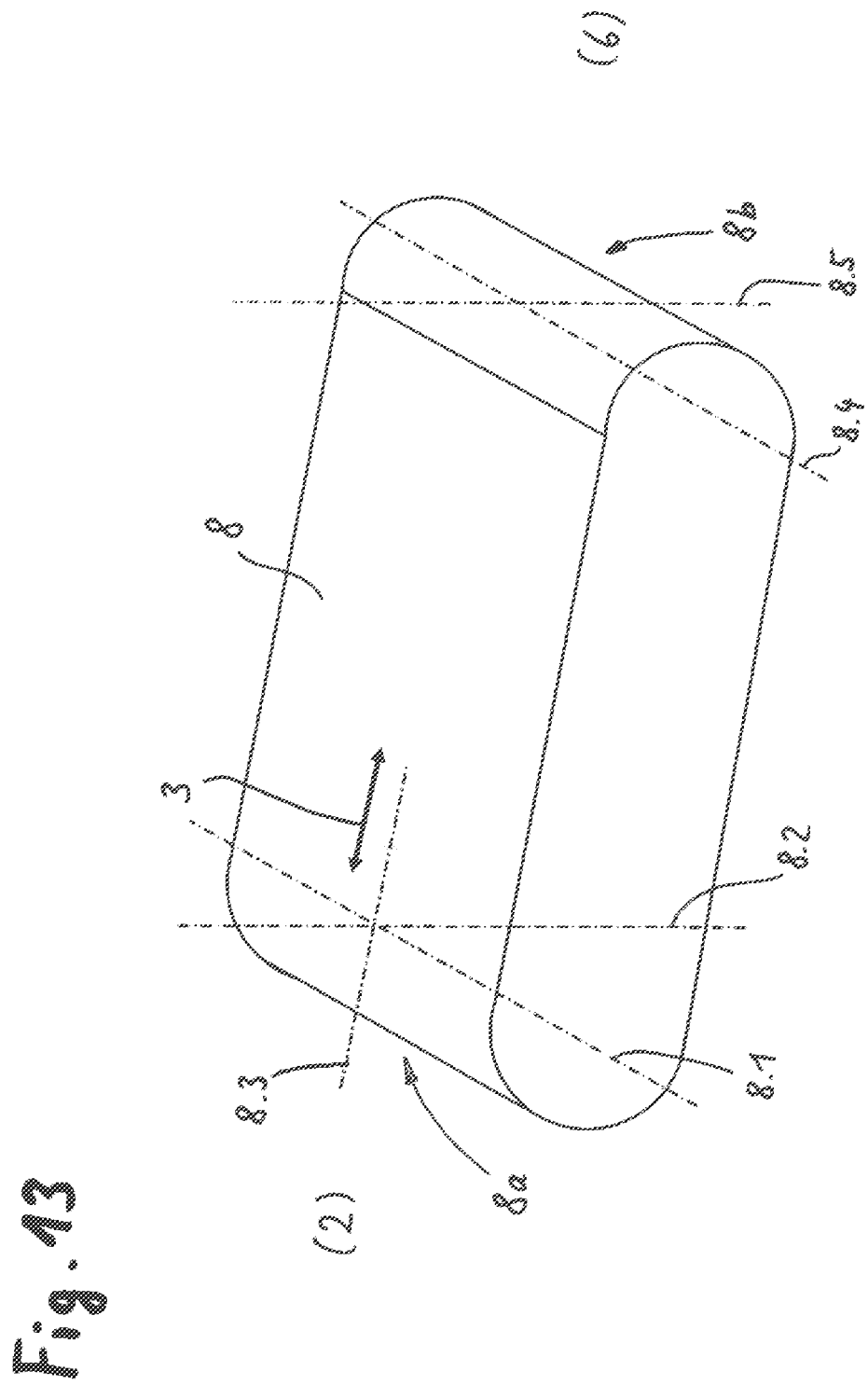

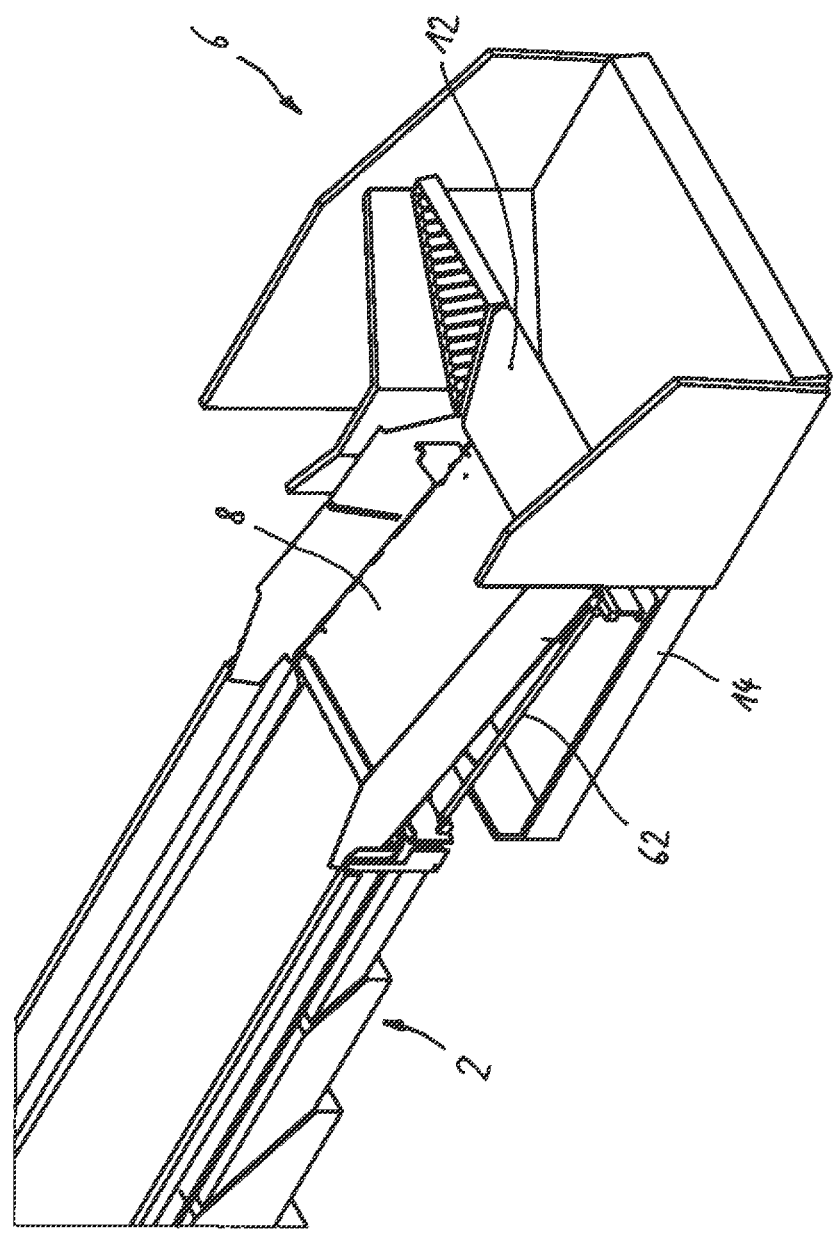

DEVICE FOR LOADING OR UNLOADING OF A TRANSPORT CONTAINER

The present application is related to and claims priority under 35 U.S.C. § 119 to German Application No. 10 2015 003 239.9, filed 10 Mar. 2015, the entirety of which is hereby incorporated herein by reference.

The invention relates to an apparatus for loading or unloading a transport container equipped with a load opening, comprising a telescopic conveyor, which has a main conveying unit and at least one telescopic conveying unit extendable relative thereto in a longitudinal direction, having a loading or unloading apparatus, which can be moved on a driving level and is coupled with the telescopic conveyor by means of a compensating device, said compensating device permitting a relative motion between the loading or unloading apparatus and the telescopic conveyor in respect to at least one degree of freedom.

Such a loading or unloading apparatus is disclosed by DE 10 2012 003 439 A1, where in the case of the apparatus described there under adverse situations with constricted conveying duct, due to loading or unloading units being misplaced to the side, it may happen that large load items remain suspended or stuck in the transition area between the loading or unloading unit and the telescopic conveyor.

The object of the invention consists of ensuring safe transfer of any load items from the loading or unloading apparatus to the telescopic conveyor and/or vice versa.

In order to achieve this object in the case of a generic apparatus the invention proposes that a compensating conveyor which, at a rear end, is connected to the telescopic conveyor by a first joint and, at a front end, is connected end to the loading or unloading apparatus by a second joint, is arranged between the loading or unloading apparatus, which can also be called mechanical loader and a head end of the telescopic conveyor, one of the joints permitting rotatability about two rotational axes vertical to each other and to the longitudinal direction and one of the joints permitting rotatability about two rotational axes vertical to each other and to the longitudinal direction and one of the joints permitting rotatability about a rotational axis parallel to the longitudinal direction and about two rotational axes vertical to each other and to the longitudinal direction, and one of the joints additionally permitting a limited compensating movement in the longitudinal direction.

A substantial advantage consists of the fact that the conveying duct (effective through passing width of the apparatus) can be designed more widely in the same installation area, and that a greater compensation possibility between telescopic conveyor and the loading or unloading apparatus is achieved in the horizontal and vertical direction.

Thus the danger of load items becoming trapped in the transition area between loading or unloading apparatus and telescopic conveyor is lessened.

The compensating conveyor is attached to the loading or unloading apparatus and the telescopic conveyor at both ends so that it can rotate and at one end additionally held in order that it can be moved longitudinally, so that compensation is possible in the event of any relative motion between the loading or unloading apparatus and the head end of the telescopic conveyor. The compensating conveyor can be designed as a band or belt conveyor or as roller track with motorised and/or idling rollers.

The compensating device can include two coupling bars, with which the telescopic conveyor is connected to the loading or unloading apparatus. The coupling bars are preferably parallel and identical in length, so that at least two degrees of freedom of a relative movement are obtained substantially along a plane vertical to the driving level, and possibly additional degrees of freedom of rotation about a swiveling axis vertical to the longitudinal axis and/or about a rotational axis parallel to the longitudinal direction.

The coupling bars are preferably always attached with ball joints at the end side.

Preferably it is proposed that the compensating device permits pivotability of the loading or unloading apparatus relative to the telescopic conveyor about at least one rotational axis. A rotational axis can be formed by a swiveling axis running vertically to the longitudinal axis and parallel to the driving level. A further rotational axis can run parallel to the longitudinal axis or vertically to the swiveling axis. A degree of freedom of rotation about an axis running vertically to the driving level is preferably impossible.

In addition the compensating device preferably allows linear mobility of the loading or unloading apparatus relative to the telescopic conveyor in at least one direction. The compensating device can permit mobility of the loading or unloading apparatus relative to the telescopic conveyor in a plane containing the swiveling axis. For implementing mobility in the first direction it may be proposed that the compensating device has a first linear guide held so that it can pivot about the swiveling axis in a first direction parallel to the swiveling axis. For implementing mobility in the level mentioned it may be proposed that the compensating device has a second linear guide in a second direction, supported by the first linear guide, which runs vertically to the first direction and in the plane mentioned.

It may be proposed that the loading or unloading apparatus can be detachably coupled with the telescopic conveyor by means of a quick connector mechanism or a high-speed coupling device. The quick connector mechanism and/or the high-speed coupling device preferably permits fast coupling or decoupling of the two components without tools, for example manually, preferably pneumatically or hydraulically. For example a ratchet mechanism can be provided, with which corresponding ratchet elements can be engaged or locked.

The compensating device can have a first connection plate, on which one, to be exact the first or second linear guide, and the other supported on this linear guide, to be exact the second or first linear guide, are held, the other linear guide being fixed either on the one component, the telescopic conveyor or the loading or unloading apparatus, and it being possible to fix the first connection plate permanently or by means of the quick connector mechanism or a high-speed coupling device detachably to the other component, the loading or unloading apparatus or the telescopic conveyor.

It may be proposed that the quick connector mechanism is arranged between the first connection plate and a second connection plate, the second connection plate being permanently attached to the other component.

The first linear guide can be coupled with the second linear guide via a joint connection rotatably about the swiveling axis and the rotational axis vertical thereto.

It may be proposed that two parallel spaced linear guide elements are arranged either on the loading or unloading apparatus or on the telescopic conveyor, on which a first guide is placed in each case, whereby a second guide is held on each first guide via in each case a rotational joint pivotable about the rotational axis, which can be designed especially as a round table bearing, and a further linear guide element is held on the second guides and placed pivotably about the swiveling axis and which can be coupled by means of the first connection plate and the quick connector mechanism with the particular respective component, the loading or unloading apparatus or the telescopic conveyor. In particular it may be proposed that the linear guide elements are guide rods.

The loading or unloading apparatus can be designed as loading robot with a grab arm having several degrees of freedom, for example with three, four, five or six axes. Expediently a transfer conveyor is arranged between the loading robot and the compensating conveyor.

The loading or unloading apparatus can be arranged on a platform, which can be moved in a steered way on the driving level.

Alternatively the loading or unloading apparatus can be designed as loading conveyor with a receiving conveyor and a transfer conveyor adjoining this, the transfer conveyor being connected to the compensating conveyor. Expediently a delivery end of the transfer conveyor is arranged above the compensating conveyor and overlapping this so that load items cannot become trapped.

Preferably the compensating conveyor, at its rear end, is arranged above the head end of the telescopic conveyor and overlapping this so that load items also here cannot become trapped.

Figure 2:
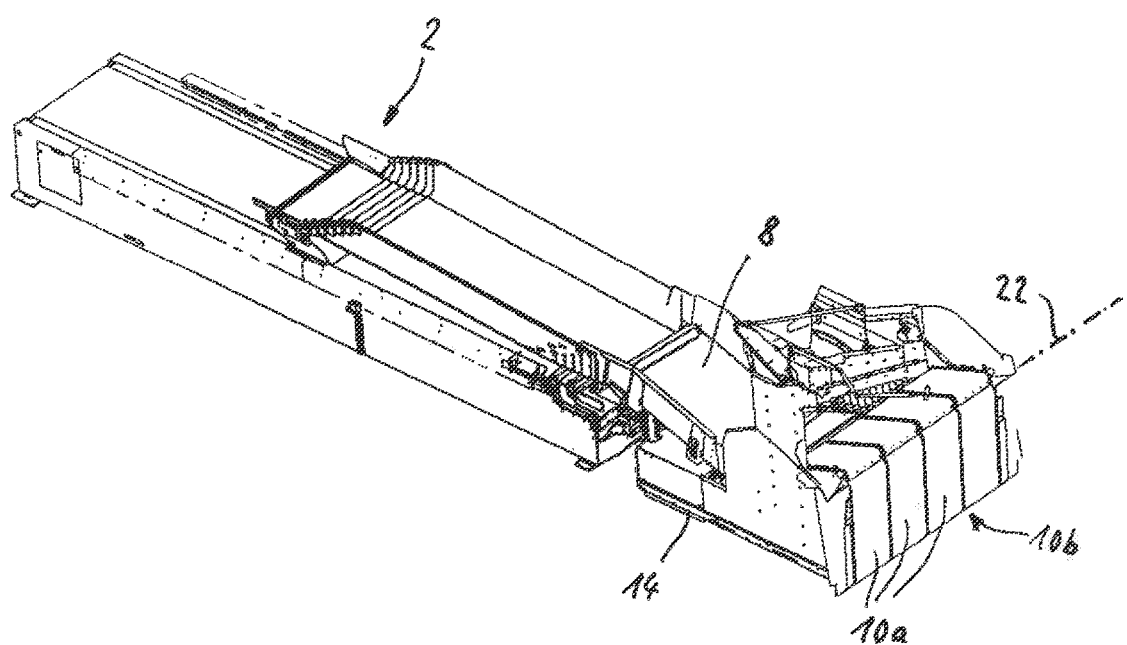

The invention is described below on the basis of an exemplary embodiment, reference being made to a drawing, wherein FIG. 1 is a perspective view of an apparatus according to the invention for loading or unloading a transport container in a loading and/or unloading position, the loading or unloading apparatus being designed as combination of two conveyors, FIG. 2 shows the apparatus according to FIG. 1 in a second unloading position of the loading or unloading apparatus, FIG. 3 is a plan view onto the apparatus according to FIG. 1, in normal position, FIG. 4 is a plan view onto the apparatus according to FIG. 1, in a swung-out position ("left"), FIG. 5 is a plan view similar to FIG. 3, in a second swung-out position ("right"), FIG. 6 shows the apparatus according to FIGS. 1 to 4 in a lateral view in a position, where the driving level of the loading and unloading apparatus is the same height as the standing level of the telescopic conveyor, FIG. 7 is a view similar to FIG. 6, wherein the driving level of the loading or unloading apparatus is lowered relative to the position according to FIG. 6, FIG. 8 is a view similar to FIG. 6, wherein the driving level is illustrated in a higher position, FIG. 9 is a schematic lateral view of the apparatus in the region of the compensating conveyor and the compensating device, FIG. 10 schematically illustrates the degrees of freedom of the compensating device, FIGS. 11 and 12 further clarify the compensating device, FIG. 13 illustrates the degrees of freedom of the joints of the compensating conveyor, and FIG. 14 depicts an embodiment with coupling bars.

The apparatus shown in the drawings and described below substantially serves to unload a transport container not illustrated in detail, which is provided with a lateral load opening, such as for example a swap container, a transport container or a truck loading space, the apparatus as a substantial component having a telescopic conveyor 2, which includes a main conveying unit 2.0 and a number of telescopic conveying units 2.1, 2.2, 2.3, 2.4, 2.5 and 2.6 which can be extended in a telescopic way relative thereto (especially FIG. 5). One direction of extension of the telescopic conveying elements is parallel to a conveying direction or longitudinal direction 3, in which the telescopic conveyor can be moved. In the embodiment illustrated each individual telescopic conveying unit 2.1 . . . 2.6 has its own infinitely running conveyor. A last or highest telescopic conveying unit 2.6 with its front end forms a head end 2a of the telescopic conveyor. A longitudinal center line of the telescopic conveyor is referenced with 2c (FIGS. 3 to 5).

A loading or unloading apparatus 6 is coupled on at a front end of the telescopic conveyor 2, reference also being made to FIGS. 9 and 13, as further substantial component of the apparatus by means of a compensating device 5, where a compensating conveyor 8, as further substantial component of the apparatus, bridges a transition area between the head end 2a of the telescopic conveyor 2 and the loading or unloading apparatus 6. The compensating conveyor 8 is connected at its rear end facing the telescopic conveyor 2 by a first joint 8a rotatable in all directions to the telescopic conveyor 2, which in other words permits a swiveling movement about two rotational axes 8.1, 8.2 vertical to each other and to the longitudinal direction 3, a rotating motion about a rotational axis 8.3 parallel to the longitudinal direction 3 and additionally a linear compensating movement in the longitudinal direction 3. At its front end the compensating conveyor 8 is connected by a second joint 8b to the platform 14 and/or to the loading or unloading apparatus 6, which permits a swiveling movement about two rotational axes 8.4, 8.5 vertical to each other and to the longitudinal direction. Joint 8b thus cannot be pivoted about an axis parallel to the longitudinal direction 3.

The loading or unloading apparatus 6 can be designed as any arbitrary mechanical loader, for example as loading robot having a grab arm with several degrees of freedom, or as shown in the form of a conveying apparatus, which in the exemplary embodiment illustrated comprises two conveyors interacting with one another. A receiving conveyor 10 serves to receive a load item from the floor or from a stacked position, while a transfer conveyor 12 adjoining the receiving conveyor 10 serves to transport the load items further to the compensating conveyor 8.

The loading or unloading apparatus 6 in the form of the receiving conveyor 10 and transfer conveyor 12 with longitudinal center line 6a as well as a front end of the compensating conveyor 8, adjoining the transfer conveyor 12, is arranged on a platform 14, which can be moved on even terrain or driving level 16. A movement of the platform 14 in the longitudinal direction 3, that is to say in and towards the conveying direction of the telescopic conveyor, takes place by a suitably controlled movement of the telescopic conveyor 2 coupled with the platform 14 via the compensating device 5, while a driving movement of the platform takes place transversely to the longitudinal direction 3 by corresponding controlled steering of wheels, on which the platform can be moved on the terrain 16.

The main conveying unit 2.0 is held on a machine rack 2b of the telescopic conveyor 2 situated therebelow, which stands on a terrain or can be moved and driven in the longitudinal direction. A conveyor system adjoining a rear end of the telescopic conveyor 2, for example a sorter, is not illustrated.

The receiving conveyor 10 consists of a series of e.g. four individual receiving conveying elements 10a, for example belt conveyors, arranged side by side, each receiving conveying element 10a being adjustable actively or passively in length, which is illustrated in FIG. 1 as an example of a receiving conveying element 10a. In the case of passive adjustability in length, the receiving conveying element 10a is shortened when a corresponding force counteracts a front receiving end 10b of the receiving conveyor 10 against a resetting force and is extended when the force automatically again reduces until it reaches its original length. The transfer conveyor 12 in the embodiment described is divided up several times and consists of four transfer conveying elements 12a arranged next to each other in the form of belt conveyors, a further subsidiary belt conveyor 12b as well as a laterally arranged roller track 12c, which forms a substantially triangular or trapezoidal conveying surface. The roller track 12c has rollers arranged sloping towards the longitudinal direction 3, in order to obtain a conveying component directed to a vertical longitudinal center plane of the telescopic conveyor 2. Lateral guide plates 12d are arranged on an outside edge of the roller track 12c as well as on an opposite edge of the belt conveyor 12b, in order to steer load items towards the compensating conveyor 8.

By means of the different positions of receiving and transfer conveyors 10, 12 in FIGS. 1 and 2 it is recognizable that the transfer conveyor 12 at a transfer end 12e is held pivotably about a first swiveling axis 20, which is arranged horizontally and transversely to the longitudinal direction 3, so that the transfer conveyor 12 is height-adjustable in its front region, especially at a hand-over end 12f.

The receiving conveyor 10 is held height-adjustably on the transfer conveyor 12 about a second swiveling axis 22, which is arranged adjacent to and especially at the hand-over end 12f of the transfer conveyor 12 horizontally and transversely to the conveying direction 3, so that a foremost receiving end 10b of the receiving conveyor 10 can be pivoted and height-adjusted, independently of vertical adjustment of the hand-over end 12f of the transfer conveyor 12.

When the receiving conveyor 10 is designed as belt or roller conveyor the second swiveling axis 22 preferably runs through a motorised or guide roller of the receiving conveyor 10 arranged at a delivery end 10c of the receiving conveyor 10, or through a motorised or guide roller arranged at the hand-over end 12f of the transfer conveyor 12.

FIG. 1 shows a lower unloading position of the apparatus, in which the receiving end 10b of the receiving conveyor is located on or directly above the terrain 16 and receiving conveyor and transfer conveyor 10, 12 have a substantially identical inclination in respect to the horizontal or the terrain 16, so that load items lying or stacked up on the ground can be picked up by impetus of the receiving conveyor 10 and transfer conveyor 12 in the conveying direction 3 and can be taken towards the telescopic conveyor 2.

FIG. 2 shows another unloading position, in which the receiving conveyor 10 is pivoted substantially vertically about the second swiveling axis 22 and load items more highly stacked can be picked up by the transfer conveyor 12.

FIGS. 3 to 8 serve to illustrate the compensating device 5, by means of which the platform 14 together with the loading or unloading apparatus 6 located thereon is detachably coupled with the telescopic conveyor 2. The compensating device 5 by means of compensating elements firstly permits a swiveling movement of the platform 14 relative to the telescopic conveyor 2 about a swiveling axis 30 oriented parallel to the driving level 16 and transversely to the longitudinal direction 3 (FIGS. 1, 4, 5, 6) and also a rotational and/or a swiveling movement about a rotational axis 58 oriented vertically to the swiveling axis 30.

In addition the compensating device 5 permits limited horizontal mobility of the platform 14 relative to the telescopic conveyor 2, parallel to the driving level 16, such a lateral movement and a corresponding position of the compensating conveyor 8 being illustrated in FIGS. 4 and 5 in contrast to a neutral position in accordance with FIG. 3.

Finally the compensating device 5 permits limited mobility of the platform 14 relative to the telescopic conveyor 2 in a direction vertical to the direction of the horizontal mobility in a plane 32, which is vertical to the rotational axis 58 and for example can be oriented vertically to the longitudinal direction 3 and to the driving level 16. FIGS. 6 and 7 by way of example show movements of the platform 14 below and above a neutral position in accordance with FIG. 5. The plane 32 in FIG. 5 lies vertically to the level in the drawing.

FIGS. 10 to 12 by way of example illustrate the structure of the compensating device 5 and the compensating elements included there, in which the platform 14 can be coupled with the telescopic conveyor 2, the degrees of freedom described above of a relative movement between the two components being obtained, as well as schematically the quick connector mechanism 4.

Two parallel spaced linear guide elements are arranged on the platform 14 in the form of guide rods 42, which define the plane 32. A first guide 44 is placed on each guide rod 42 so that it is adjustable in length, for example as a sleeve by positive enclosure of the guide rod 42 or as a kind of a ball bushing. A second guide 48 is held on each first guide 44 by means of a rotational joint 46, for example a round table bearing which due to the rotational joint 46 can pivot about a rotational axis 50 vertical to the swiveling axis 30 relative to the first guide 44. A further linear guide element in the form of a guide rod 52 is held on the two second guides 48 towards the swiveling axis 30 so that it can be adjustable in length, the second guides 48 being able to move towards the swiveling axis 30 on the guide rod 52, for example as a sleeve by positive enclosure of the guide rod 52 or as a kind of ball bushing.

The guide rod 52 is finally held via a first connection plate 40 by means of a quick connector mechanism 4, that is to say preferably detachably on the telescopic conveyor 2 without tools, so that the degrees of freedom shown in FIGS. 10 and 11 between platform 14 and telescopic conveyor 2 result. These firstly consist of pivotability about the swiveling axis 30 arranged parallel to the driving level 16 and vertically to the longitudinal direction 3 and also of the two linear movement possibilities in the plane 32, illustrated by a horizontal linear degree of freedom 54 as the first direction and a linear degree of freedom 56 vertical, especially perpendicular, thereto as the second direction (FIG. 10). In addition there is relative pivotability between platform 14 and telescopic conveyor 2 about a rotational axis 58 arranged parallel to the rotational axes 50, which is oriented vertically to the plane 32 and the guide rods 42.

FIG. 9 schematically shows that the compensating device 5 is held on the platform 14 and/or on the loading and unloading apparatus 6, the first connection plate 40 being illustrated adjacent thereto. The quick connector mechanism 4, which connects the first connection plate 40 to a second connection plate 60 firmly joined to the telescopic conveyor 2, serves detachable coupling to the telescopic conveyor 2.

FIG. 14 shows a variant of the apparatus, in which the compensating device is formed by two coupling bars 62. The two coupling bars 62 are arranged parallel to each other and are identical in length. Both coupling bars are connected in each case at their mutual ends by means of a ball joint (spherical head) on the one hand to the telescopic conveyor and on the other hand to the platform and/or the loading or unloading apparatus 6.

REFERENCE SYMBOL LIST

2 Telescopic conveyor
2a Head end
2b Machine rack
2c Longitudinal center line
2.0 Main conveying unit
2.1 . . . 2.6 Telescopic conveying unit
3 Conveying direction (longitudinal direction)
4 Quick connector mechanism (high-speed coupling device)
5 Compensating device
6 Loading or unloading apparatus
6a Longitudinal center line
8 Compensating conveyor
8a First joint
8b Second joint
8.1, 8.2, 8.3 Rotational axes (of 8a)
8.4, 8.5 Rotational axes (of 8b)
10 Receiving conveyor
10a Receiving conveying element
10b Receiving end
10c Delivery end
12 Transfer conveyor
12a Transfer conveying element
12b Belt conveyor
12c Roller track
12d Guide plate
12e Transfer end
12f Hand-over end
14 Platform
16 Terrain (driving level)
20 First swiveling axis
22 Second swiveling axis
30 Swiveling axis
32 Plane
40 First connection plate
42 Guide rod (linear guide element)
44 First guide
46 Rotational joint
48 Second guide
50 Rotational axis
51 Arrow (rotational axis 50)
54 Horizontal degree of freedom (first direction)
56 Vertical degree of freedom (second direction)
58 Rotational axis
60 Second connection plate
62 Coupling bar

The invention claimed is:

1. Apparatus for loading or unloading a transport container provided with a load opening, comprising:
    a telescopic conveyor, which has a main conveying unit and at least one telescopic conveying unit extendable relative thereto in a longitudinal direction, the longitudinal direction defined by a conveying direction of the apparatus;
    a loading or unloading apparatus, which can be moved on a driving level;
    a compensating device that couples the loading or unloading apparatus with the telescopic conveyor;
    a compensating conveyor that is arranged between the loading or unloading apparatus and a head end of the telescopic conveyor;
    a first joint, wherein the compensating conveyor, at a rear end, is connected via the first joint to the telescopic conveyor;
    a second joint, wherein the compensating conveyor, at a front end, is connected via the second joint to the loading or unloading apparatus;
    wherein one of the first and second joints permits rotatability about two rotational axes perpendicular to each other and to the longitudinal direction and another of the first and second joints permits rotatability about a rotational axis parallel to the longitudinal direction and about two rotational axes perpendicular to each other and to the longitudinal direction, and one of the first and second joints additionally permitting a limited compensating movement in the longitudinal direction;
    wherein the second joint is configured such that when the loading or unloading apparatus is raised relative to the telescopic conveyor the front end of the compensating conveyor raises with the loading or unloading apparatus relative to the telescopic conveyor and to the rear end of the compensating conveyor, and when the loading or unloading apparatus is lowered relative to the telescopic conveyor the front end lowers with the loading or unloading apparatus relative to the telescopic conveyor and the rear end; and
    wherein the compensating device permits pivotability of the loading or unloading apparatus relative to the telescopic conveyor about a swiveling axis running perpendicularly to the longitudinal direction and parallel to the driving level, permits mobility of the loading or unloading apparatus relative to the telescopic conveyor in a plane containing the swiveling axis and excludes a degree of freedom of rotation about an axis running vertically to the driving level.

2. Apparatus according to claim 1, characterized in that the compensating device has two coupling bars, with which the telescopic conveyor is connected to the loading or unloading apparatus.

3. Apparatus according to claim 1, characterized in that the compensating device has a first linear guide held pivotably about the swiveling axis in a first direction parallel to the swiveling axis.

4. Apparatus according to claim 3, characterized in that the compensating device has a first linear guide held pivotably about the swiveling axis in a first direction parallel to the swiveling axis and has a second linear guide supported by the first linear guide in a second direction, which runs perpendicularly to the first direction and in the plane.

5. Apparatus according to claim 4, characterized in that the loading or unloading apparatus can be detachably connected by means of a high-speed coupling device to the telescopic conveyor.

6. Apparatus according to claim 5, characterized in that the compensating device has a first connection plate, on which the first linear guide, and the second linear guide supported on the first linear guide, are held, wherein the second linear guide is fixed on the telescopic conveyor and the first connection plate is detachably held permanently or by means of the high-speed coupling device on the loading or unloading apparatus.

7. Apparatus according to claim 6, characterized in that the high-speed coupling device is arranged between the first connection plate and a second connection plate, wherein the second connection plate is permanently attached to the loading or unloading apparatus.

8. Apparatus according to claim 3, characterized in that the compensating device has a first connection plate, on which the first linear guide, and the second linear guide supported on the first linear guide, are held, wherein the second linear guide is fixed on the telescopic conveyor and the first connection plate is detachably held permanently or by means of the high-speed coupling device on the loading or unloading apparatus.

9. Apparatus according to claim 8, characterized in that the high-speed coupling device is arranged between the first connection plate and a second connection plate, wherein the second connection plate is permanently attached to the loading or unloading apparatus.

10. Apparatus according to claim 4, characterized in that the compensating device has a first connection plate, on which the first linear guide, and the second linear guide supported on the first linear guide, are held, wherein the second linear guide is fixed on the telescopic conveyor and the first connection plate is detachably held permanently or by means of the high-speed coupling device on the loading or unloading apparatus.

11. Apparatus according to claim 10, characterized in that the high-speed coupling device is arranged between the first connection plate and a second connection plate, wherein the second connection plate is permanently attached to the loading or unloading apparatus.

12. Apparatus according to claim 3, characterized in that the first linear guide is coupled with the second linear guide via a joint connection rotatable about the swiveling axis and the rotational axis vertical thereto.

13. Apparatus according to claim 12, characterized in that two parallel spaced linear guide elements are arranged either on the loading or unloading apparatus or on the telescopic conveyor, on which a first guide is placed in each case, wherein a second guide is held on each first guide by means of a swivel joint in each case, rotatably about the rotational axis, and a further linear guide element is placed on the second guides and held pivotably about the swiveling axis.

14. Apparatus according to claim 12, characterized in that the further linear guide element can be coupled by means of the connection plate and the high-speed coupling device with the loading or unloading apparatus or with the telescopic conveyor.

15. Apparatus according to claim 4, characterized in that the first linear guide is coupled with the second linear guide via a joint connection rotatable about the swiveling axis and the rotational axis vertical thereto.

16. Apparatus according to claim 15, characterized in that two parallel spaced linear guide elements are arranged either on the loading or unloading apparatus or on the telescopic conveyor, on which a first guide is placed in each case, wherein a second guide is held on each first guide by means of a swivel joint in each case, rotatably about the rotational axis, and a further linear guide element is placed on the second guides and held pivotably about the swiveling axis.

17. Apparatus according to claim 16, characterized in that the further linear guide element can be coupled by means of the connection plate and the high-speed coupling device with the loading or unloading apparatus or with the telescopic conveyor.

18. Apparatus according to claim 5, characterised in that the compensating device has a first connection plate, on which the second linear guide and the first linear guide supported on the second linear guide are held, wherein the first linear guide is fixed on the telescopic conveyor and the first connection plate is detachably held permanently or by means of the high-speed coupling device on the loading or unloading apparatus.

19. Apparatus according to claim 18, characterized in that the high-speed coupling device is arranged between the first connection plate and a second connection plate, wherein the second connection plate is permanently attached to the loading or unloading apparatus.

20. Apparatus according to claim 5, characterised in that the compensating device has a first connection plate, on which the second linear guide and the first linear guide supported on the second linear guide are held, wherein the first linear guide is fixed on the loading or unloading apparatus, and the first connection plate is detachably held permanently or by means of the high-speed coupling device on the telescopic conveyor.

21. Apparatus according to claim 20, characterized in that the high-speed coupling device is arranged between the first connection plate and a second connection plate, wherein the second connection plate is permanently attached to the telescopic conveyor.

22. Apparatus according to claim 5, characterized in that the first linear guide is coupled with the second linear guide via a joint connection rotatable about the swiveling axis and the rotational axis vertical thereto.

23. Apparatus according to claim 22, characterized in that two parallel spaced linear guide elements are arranged either on the loading or unloading apparatus or on the telescopic conveyor, on which a first guide is placed in each case, wherein a second guide is held on each first guide by means of a swivel joint in each case, rotatably about the rotational axis, and a further linear guide element is placed on the second guides and held pivotably about the swiveling axis.

24. Apparatus according to claim 22, characterized in that the further linear guide element can be coupled by means of the connection plate and the high-speed coupling device with the loading or unloading apparatus or with the telescopic conveyor.

25. Apparatus according to claim 5, characterised in that the compensating device has a first connection plate, on which the first linear guide and the second linear guide supported on the first linear guide are held, wherein the second linear guide is fixed on the loading or unloading apparatus, and the first connection plate is detachably held permanently or by means of the high-speed coupling device on the telescopic conveyor.

26. Apparatus according to claim 25, characterized in that the high-speed coupling device is arranged between the first connection plate and a second connection plate, wherein the second connection plate is permanently attached to the telescopic conveyor.

* * * * *